Sept. 1, 1925.

H. B. SANKEY

SHEET METAL VEHICLE WHEEL

Original Filed Nov. 11, 1919

1,552,350

INVENTOR
Harold B. Sankey
BY Frank Chase Sowles
ATTORNEY.

Patented Sept. 1, 1925.

1,552,350

UNITED STATES PATENT OFFICE.

HAROLD B. SANKEY, OF WOLVERHAMPTON, ENGLAND.

SHEET-METAL VEHICLE WHEEL.

Application filed November 11, 1919, Serial No. 337,361. Renewed June 25, 1925.

*To all whom it may concern:*

Be it known that I, HAROLD BANTOCK SANKEY, a subject of the King of Great Britain, and residing at Wolverhampton, in the county of Stafford, England, have invented certain new and useful Improvements in Sheet-Metal Vehicle Wheels, of which the following is a specification.

This invention relates to sheet metal wheels, whether of the spoked or disc type, in which the spokes or the disc and the wheel nave are set out a considerable distance from the mid plane of the wheel; and consists, in the case of a spoked wheel, in arranging the nave and a considerable length of each spoke, measured from the nave, to lie in the same plane with each other, and the spokes to be cranked in to their juncture with the felloe and rim, in order to allow the brake drum or the steering head to be positioned at or near to the mid plane of the wheel to facilitate pivotal steering; and, in the case of a disc wheel, in providing an inwardly extending flange of the disc positioned at an intermediate zone of the disc some distance inwards of its outer periphery to act as a brake drum or to carry the brake drum, or give resiliency to the disc, as hereinafter described, or to form a means of attachment to another disc portion by which it may be connected to the hub.

In the case of a disc wheel, the inward flange is preferably formed as a deep corrugation of the sheet metal of the disc, and the opposite sides may be closed up or may be spaced apart, in which latter case an elastic medium may be introduced into the space to damp out shocks due to vibration. The rim of the wheel is united integrally or otherwise with the disk.

According to a modification of the invention, as it relates to a disc wheel, the middle portion of the disc may be made separately from the surrounding portion, and the inwardly projecting flange be formed by flanging the outer edge of the middle portion and fixing the inner edge of the outer portion thereto.

Convenient practical forms of the invention are illustrated by the drawings herewith, of which:—

Figure 2:
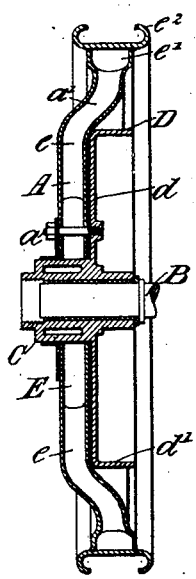
Figure 2 is a vertical section taken on line 2—2 of Figure 1.
Figure 1:
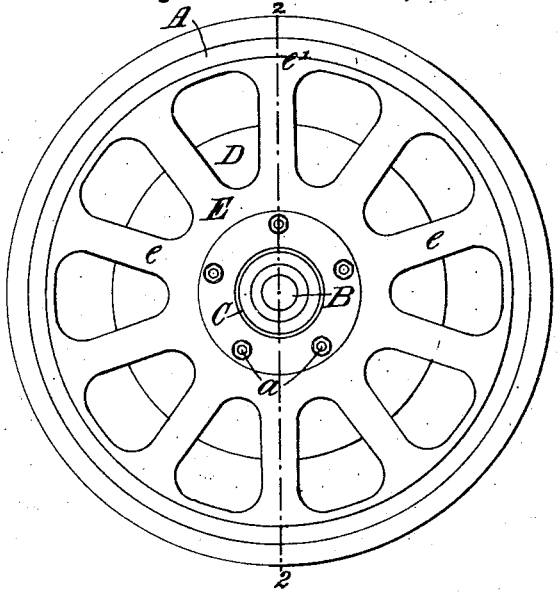
Figure 1 is an outer side view in elevation of a rear wheel of the spoked type for a motor car, constructed according to this invention.

Referring first to Figures 1 and 2:—The wheel A is mounted upon a hub C which is mounted upon a driving shaft B. The hub C has attached thereto a brake drum D, consisting of a web $d$ and flange $d'$. The nave E of the wheel is secured to the web $d$ by suitable studs $a$ and has formed integral with it the spokes $e$, felloe $e'$ and rim $e^2$. The nave, spokes, felloe and rim are built up from sheet metal and welded together in a manner now usual in wheels of the well known "Sankey" type.

The spokes $e$ lie in the same plane with each other for such a distance from the nave as will clear them from the brake drum and are then cranked inwards at $a'$ in a manner as shown to cause the central plane of the tread to be coincident with the central plane of the brake drum.

Figure 3:
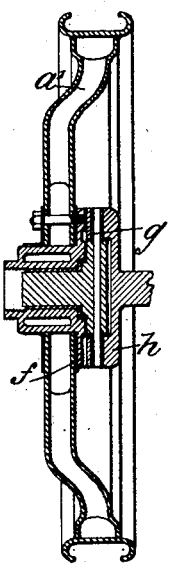
Figure 3 is a view corresponding to Figure 2, but illustrating a steering wheel.

Referring to Figure 3, the construction is the same as in Figures 1 and 2 except that the brake drum D is replaced by a flange $f$ to which the nave of the wheel is bolted, and that the driving shaft is replaced by an axle end which is carried from a pivot pin $g$ which is journalled in a steering head $h$. The spokes are cranked at $a'$, similarly as in the wheel illustrated in Figures 1 and 2, in a manner to cause the central plane of the tread to be coincident with the axis of the pivot pin $g$.

Figure 5:
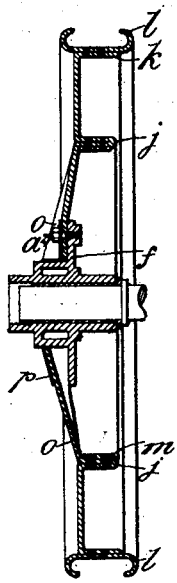
Figures 4, 5 and 6, are views corresponding respectively to Figures 1, 2 and 3, but illustrating a convenient application of the invention to disc wheels for motor cars.
Figure 4:
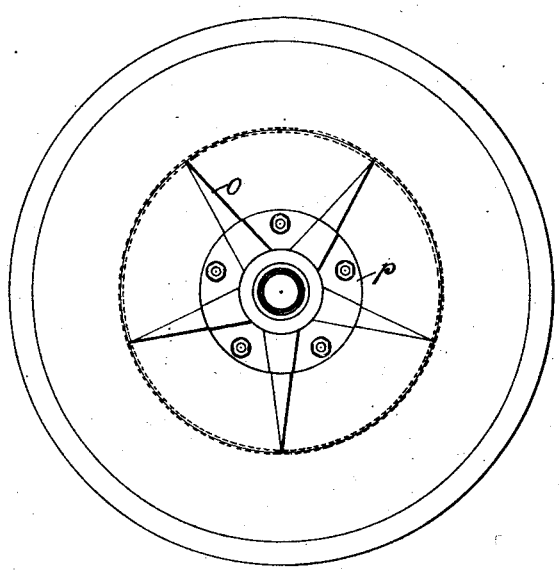

Referring to Figures 4 and 5, the wheel is formed as a sheet metal disc wheel and has an inwardly extending co-axial flange formed as a corrugation $j$. In this figure the sides of the corrugation are closed up one against the other. An inwardly extending outer flange $k$ is also formed at the periphery of the wheel to which the rim $l$ may be riveted or otherwise fixed. A wheel with a brake drum so constructed is very light compared with a wheel and separately formed brake drum as usually constructed. $m$ is a hard metal ring with which the brake shoe is adapted to engage and this ring is secured to the inner surface of the flange $j$ such as by riveting. The sheet metal of the disc or web portion of the wheel has radial tapering flutes $o$ formed therein to give additional strength. The web of the wheel is clamped between the flange $f$ of the hub and a cap $p$ by studs $a^2$ of the flange $f$.

Figure 6:
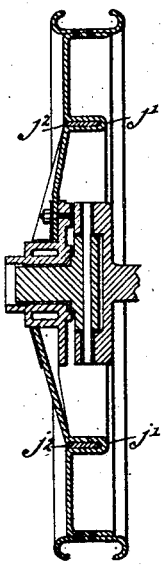

Referring to Figure 6 the construction of the wheel is similar to Figures 4 and 5 except that the corrugation $j'$ is left open from its outer side to give the wheel resiliency, and if desired a packing of elastic material $j^2$ may be inserted between the two walls of the corrugation. Also in this figure the wheel is shown as a steering wheel, and it will be seen that the central plane of the tread is coincident with the axis of the pivot of the steering head.

Having fully described my invention, what I claim and desire to secure by Letters Patent, is:—

1. A vehicle wheel comprising a nave, a rim, a body connecting said rim and nave and a brake drum, said body having its central portion set out a considerable distance from the mid-plane of the wheel, the outer rim-carrying portion of said body being spaced laterally from said central portion towards the mid-plane of the wheel, and the mid-plane of said brake drum being disposed substantially in the mid-plane of the rim.

2. A disc wheel comprising a disc set out a substantial distance from the mid plane of the wheel, and a coaxial flange projecting from said body and having its mid-plane substantially coincident with the mid plane of the wheel and being positioned at an intermediate zone of the disc—some distance—inwards of the outer periphery thereof.

3. A sheet metal disc wheel comprising a disc set out a substantial distance from the mid plane of the wheel, and a coaxial flange formed as a deep corrugation of the metal of the disc, projecting in the direction of the mid plane of the wheel and being positioned at an intermediate zone of the disc some distance inwards of the outer periphery thereof.

4. A sheet metal disc wheel comprising a disc set out a substantial distance from the mid plane of the wheel, and a coaxial flange formed as a deep corrugation of the metal of the disc, said corrugation having its sides closed together and projecting in the direction of the mid plane of the wheel and being positioned at an intermediate zone of the disc some distance inwards of the outer periphery thereof.

5. A disk wheel comprising a disk set out a substantial distance from the mid-plane of the wheel and provided with an outer coaxial flange at its periphery and with an intermediate coaxial flange projecting in the direction of the mid-plane of the wheel and disposed at an intermediate zone of the disk some distance inwards from the outer periphery thereof, and a rim secured to said outer flange.

6. A sheet metal disc wheel comprising a disc set out a substantial distance from the mid plane of the wheel, a coaxial flange projecting in the direction of the mid plane of the wheel and being positioned at an intermediate zone of the disc some distance inwards of the outer periphery thereof, and a second flange forming the rim of the wheel and extending also in the direction of the mid plane of the wheel.

7. A vehicle wheel comprising a body set out a substantial distance from the mid-plane of the wheel, and a coaxial flange projecting from said body and having its mid-plane substantially coincident with the mid-plane of the wheel and being positioned at an intermediate zone of the body some distance inward from the periphery thereof.

8. A sheet metal disc wheel comprising a disc set out a substantial distance from the mid plane of the wheel, a coaxial flange projecting in the direction of the mid plane of the wheel and being positioned at an intermediate zone of the disc some distance inwards of the outer periphery of the disc, and radial strengthening flutes formed in the metal of the disc.

In witness whereof I have hereunto signed my name this twenty-fifth day of October, 1919.

HAROLD B. SANKEY.